T. A. PRENDERGAST.
EARTHWORKING MACHINE.
APPLICATION FILED MAR. 18, 1920.
1,397,653.
Patented Nov. 22, 1921.
3 SHEETS—SHEET 3.
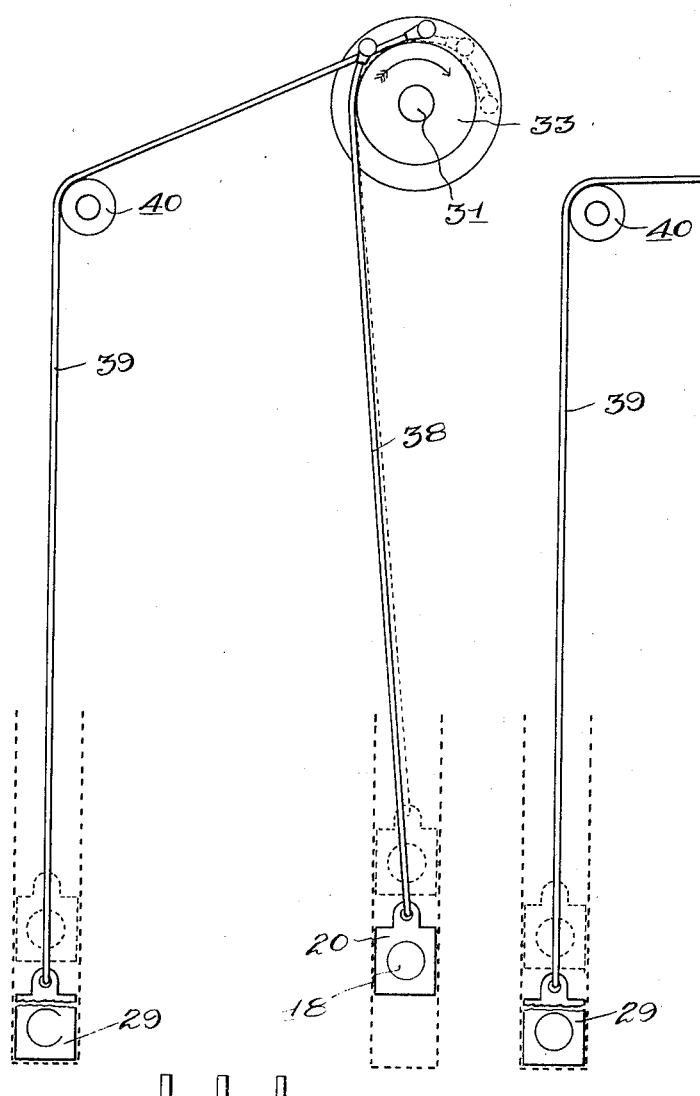
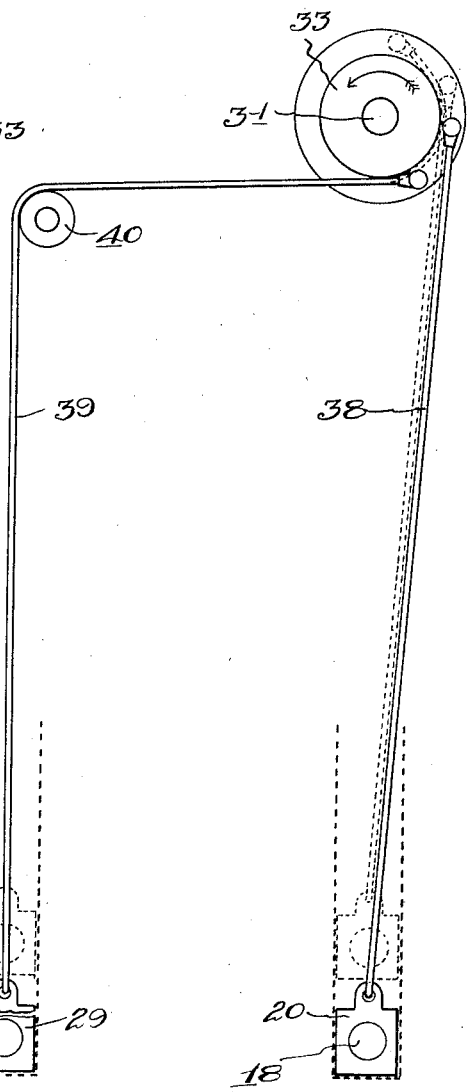
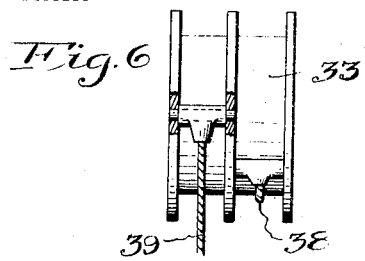
Inventor
Thomas Augustus Prendergast
By Bradbury + Caswell
Attorneys

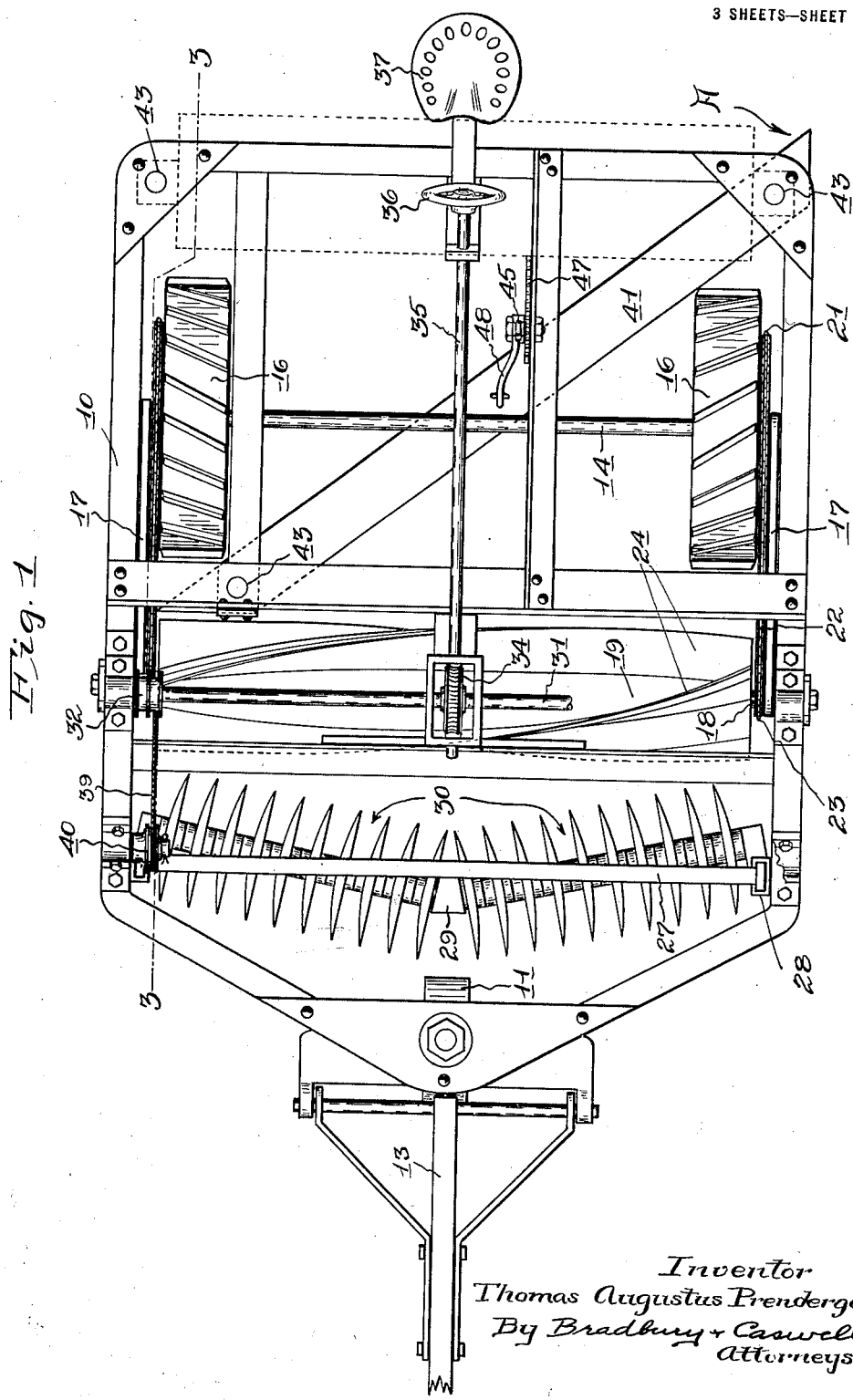

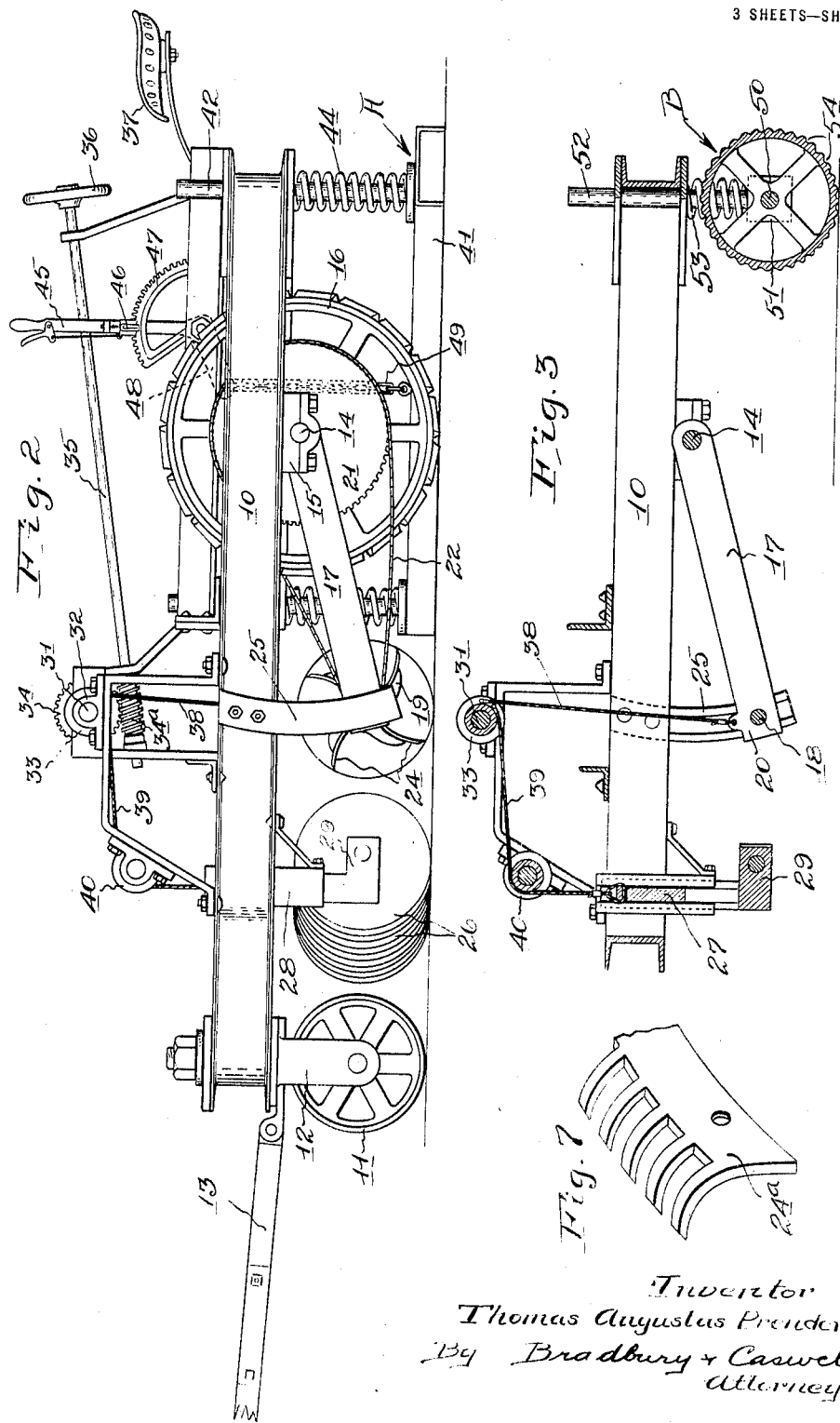

UNITED STATES PATENT OFFICE.

THOMAS AUGUSTUS PRENDERGAST, OF MILBANK, SOUTH DAKOTA.

EARTHWORKING-MACHINE.

1,397,653.  Specification of Letters Patent.  Patented Nov. 22, 1921.

Application filed March 18, 1920. Serial No. 366,808.

*To all whom it may concern:*

Be it known that I, THOMAS AUGUSTUS PRENDERGAST, a citizen of the United States, residing at Milbank, in the county of Grant and State of South Dakota, have invented a new and useful Earthworking-Machine, of which the following is a specification.

My invention relates to improvements in earth working machines.

Its object is to provide a machine of this kind designed to be employed in the maintenance of roads, in eradicating quack-grass growths and in cultivation, the latter use being substituted for the disking and dragging of fields prior to and after seeding.

A further object is to provide a machine of this class including a wheeled frame, a scoring implement carried thereby and a revolving implement carried upon said vehicle at the rear of the scoring implement and designed to work the scored surface.

A further object is to provide a machine of this kind supplied with disks or the like arranged to first score the earth in the direction of travel, a rotary planer at right angles to said disks adapted to plane and pulverize the disked surface and a leveling device following the planer.

Another object is to provide in a machine of this kind, means for lifting the earth working devices and securing the same in inoperative positions, said means including mechanism for lifting said devices simultaneously or lifting one without disturbing the other, thus adapting the machine to be readily turned and quickly and easily converted to various uses.

With the foregoing and other objects in view, which will appear in the following description, the invention resides in the novel combination and arrangement of parts and in the details of construction hereinafter described and claimed.

In the drawings Figure 1 is a plan view of my improved machine; Fig. 2 is a side elevation thereof; Fig. 3 is a sectional view taken on the line 3—3 of Fig. 1 and illustrates, in solid lines, the leveling or packing roller shown in dotted lines of Fig. 1; Figs. 4 and 5 are diagrammatical views showing the winding drums in different alternate positions and the relative positions of the boxes carrying the disks and rotor; Fig. 6 is a detail view of one of the winding drums with lifting cables attached thereto and Fig. 7 is a detail perspective view illustrating a modified form of blade for the rotor.

Referring to the drawings, I have used the reference numeral 10 to indicate the frame of my machine. A steering and supporting wheel 11 is mounted in a yoke 12 swiveled vertically in the forward end of said frame. A tongue 13, or other draft connection, is attached to said yoke 12. Extending transversely in the frame 10 is a drive shaft 14 journaled at its ends in bearings 15 on said frame. Traction wheels 16, journaled on said drive shaft 14, are connected therewith through suitable ratchet mechanism (not shown) and turn said shaft in one direction as the machine is drawn over the ground. Oscillating arms 17, pivoted on said drive shaft 14 carry a rotor 19 at the free ends thereof, said rotor being formed with trunnions 18 which are journaled in boxes 20 on the arms 17. Sprocket wheels 21 fixed to the drive shaft 14, carry sprocket chains 22 passing over smaller sprocket wheels 23 on the trunnions 18 of the rotor 19. Spiral blades 24 carried upon the rotor 19 are designed to plane the ground surface and pulverize the loosened earth as the machine is advanced. Curved guides 25 depending from the frame 10 receive the opposite ends of the trunnions 18 and prevent endwise movement of the rotor 19. The ratio of the sprocket wheels 21 and 18 is such that the peripheral speed of the blades 24 is considerably greater than the peripheral or traveling speed of the traction wheels 16. Scoring devices such as disks 26 are carried upon the frame in advance of the rotor 19 to score the ground surface in the direction of travel, preparatory to the application of the blades 24 thereto. A frame 27 slidable vertically in guides 28 on the frame 10 is provided with bearings 29 to receive the journals of obliquely arranged disking implements 30, which are normally held in working position by gravity. Mechanism is provided for lifting the disks 26 and rotor 19 simultaneously or lifting the latter without disturbing the former. This mechanism includes a drum shaft 31 journaled in bearings 32 on the frame 10. Near the ends of said shaft 31, winding drums 33 are fixed and near the middle of said shaft is a worm wheel 34. A shaft 35 journaled longitudinally on the frame 10 is supplied at the rear end thereof with a hand wheel 36 resting within easy reach of a driver's seat 37. On the forward end of said shaft 35 is a worm 34ª meshing with the worm wheel 34 on the shaft 31. Rotation of the hand wheel 36 in opposite directions causes the drums 33 to turn in reverse directions. Cables 38 attached at their upper ends to the drums 33 are connected at their lower ends to the boxes 20 on the oscillating arms 17. Cables 39 connected at their upper ends to said drums 33 pass over idler pulleys 40 on the frame 10 and are attached at their lower ends to the vertically slidable frame 27 in which the disking implements 30 are carried. It will be noted that the driving drums 33 rest directly above the rotor 19. Rotation of these drums in one direction (Fig. 5), causes the disks 26 and rotor 19 to be lifted from operative positions, while the rotation of said drums in the reverse direction, first, causes the elevation of the rotor, without disturbing the operative position of the disks. Continued rotation of said drums, however, results in lifting the disks 16 from operative position (Fig. 4). The worm gearing on the shaft 35, automatically locks the disks 18 and rotor 19 in various elevated positions. At the rear of the machine, I employ a leveling device. For road maintenance work, I use a drag A, and for field work a roller B is employed, said drag and roller being interchanged for the different uses. The drag A comprises an inverted channel bar 41 having posts 42 at its ends slidable vertically in bearings 43 in the frame 10. Encircling said posts and interposed between the frame 10 and channel bar 14 are coiled springs 44, which yieldingly hold said bar against the ground. A hand lever 45, pivoted upon the frame 10 is supplied with a hand actuated dog 46 adapted to engage a notched quadrant 47 on the frame 10, said lever being formed with an arm 48 thereon. A chain 49 is attached at its upper end to said arm 48 and secured at its lower end to the channel bar 41. The swinging of this lever rearwardly elevates the channel bar 14 against the action of the springs 44 and secures said bar in inoperative position, while the reverse movement of said lever releases the channel bar, said bar being then depressed by the action of said springs 44 and yieldingly held against the ground. Said channel bar 41 is arranged obliquely with respect to the frame 10, so as to drag surplus loosened earth toward the left of the machine, or in other words, toward the center of the roadway, thus maintaining the crown of the road. The roller B is carried upon a shaft 50 journaled in bearings 51, said bearings being supplied with upright posts 52 adapted to be slidably held in bearings 43 in the frame 10. Coiled springs 53 encircling said posts and interposed between said bearings 51 and frame 10 operate to yieldingly depress the roller B. Longitudinal corrugations 54 on said roller provide for corrugating the ground surface.

For use in the maintenance of roads, the drag A is employed, the roller B being at this time removed from the machine. The hand wheel 36 is manipulated to rotate the winding drums 33, as shown in Fig. 5 when it is desired to lift the disks 16 and rotor 19, at a turn, or in travel, said hand wheel being thereafter reversed sufficiently to lower said disks and rotor to desired working positions. The drag A is also lifted when desired, by manipulation of the hand lever 45. In field work, I prefer to substitute the roller B for the drag A. In some classes of work of this nature it is desirable to dispense with the use of the revolving knives 24. In this event, the hand wheel 36 is turned in a direction to rotate the winding drums, 33, as shown in Fig. 4. The initial movement of said drums in this direction lifts the rotor from operative position while continued rotation thereof results in lifting the disks 16. Thus it will be seen that the disks 16 may be adjusted to various working positions or lifted from the ground while the blades 24 are held in inoperative positions at various elevations above the ground surface.

In adapting my machine for use in eradicating quack-grass, I substitute serrated or toothed blades 24ª (Fig. 7) for the cutting blades 24 on the rotor 19. Said toothed blades loosen the quack-grass roots from the disked surface, said roots, being thereafter collected by a rake (not shown) attached to the machine or otherwise propelled.

Changes in the specific form of my invention, as herein described, may be made within the scope of what is claimed without departing from the spirit of my invention.

Having described my invention what I claim as new and desire to protect by Letters Patent is:

1. In a machine of the class described, a wheeled frame, a pair of earth working devices adapted to be lifted from operative positions, winding drums on the frame, mechanism for turning said drums in opposite directions, connecting means between said drums and earth working implements, the rotation of said drums in one direction being adapted to lift said earth working implements simultaneously, while the rotation of said drums in the opposite direction is adapted to lift one, only, of said implements from operative position.

2. In a machine of the class described, a wheeled frame, earth working implements thereon adapted to be lifted from the ground surface, a drum shaft journaled on said frame, winding drums on said shaft, cables connecting each drum with both of said implements, a worm wheel on said shaft, a worm in mesh with said gear and hand operated means for turning the worm in opposite directions, said worm being adapted to lock the drum shaft against rotation and turn said drums in opposite directions, the rotation of which, in one direction, lifts said implements simultaneously, while the rotation thereof in the opposite direction lifts, initially, but one of said implements.

3. In a machine of the class described, a wheeled frame, a pair of earth working devices adapted to be raised from and lowered to operative positions, lifting mechanism operatively connected with said earth working devices, one motion of said mechanism being adapted to raise said earth working implements simultaneously, while another motion of said mechanism is adapted to lift one only of said implements from operative position.

In testimony whereof, I have signed my name to this specification.

THOMAS AUGUSTUS PRENDERGAST.